US008931597B2

(12) United States Patent
White

(10) Patent No.: US 8,931,597 B2
(45) Date of Patent: Jan. 13, 2015

(54) INERTIA PUMP FOR VIBRATORY EQUIPMENT

(71) Applicant: John L. White, Seattle, WA (US)

(72) Inventor: John L. White, Seattle, WA (US)

(73) Assignee: American Piledriving Equipment, Inc., Kent, WA (US)

( * ) Notice: Subject to any disclaimer, the term of this patent is extended or adjusted under 35 U.S.C. 154(b) by 290 days.

(21) Appl. No.: 13/680,677

(22) Filed: Nov. 19, 2012

(65) Prior Publication Data

US 2014/0137677 A1 May 22, 2014

(51) Int. Cl.
*F16N 9/04* (2006.01)
*F16N 13/02* (2006.01)
*B06B 1/16* (2006.01)

(52) U.S. Cl.
CPC .......... *B06B 1/16* (2013.01)
USPC .......... 184/32

(58) Field of Classification Search
CPC .......... B06B 1/16; B06B 1/167; F16N 13/04; F16N 13/14
USPC .......... 184/30, 32
See application file for complete search history.

(56) References Cited

U.S. PATENT DOCUMENTS

| | | | | |
|---|---|---|---|---|
| 1,870,707 | A * | 8/1932 | Braselton et al. | 417/211 |
| 2,070,574 | A * | 2/1937 | Bijur | 184/7.3 |
| 2,082,770 | A * | 6/1937 | Bijur | 184/7.3 |
| 4,406,587 | A * | 9/1983 | Perry | 417/211 |
| 5,355,964 | A * | 10/1994 | White | 173/1 |
| 5,911,280 | A * | 6/1999 | Bald | 173/1 |
| 5,988,297 | A * | 11/1999 | Zimmerman et al. | 173/49 |
| 6,089,352 | A * | 7/2000 | Kim et al. | 184/6.16 |
| 6,161,650 | A * | 12/2000 | Ostergaard et al. | 184/13.1 |
| 6,220,393 | B1 * | 4/2001 | Oh et al. | 184/6.16 |
| 6,409,484 | B1 * | 6/2002 | Hyun | 417/417 |
| 6,431,795 | B2 * | 8/2002 | White | 405/232 |
| 6,543,966 | B2 * | 4/2003 | White | 405/232 |
| 7,805,865 | B2 * | 10/2010 | Paske | 37/403 |
| 7,828,393 | B2 * | 11/2010 | Yao et al. | 299/37.3 |
| 8,070,460 | B2 * | 12/2011 | Lee | 417/211 |
| 8,556,599 | B2 * | 10/2013 | Lee et al. | 417/417 |

* cited by examiner

*Primary Examiner* — Henry Liu
(74) *Attorney, Agent, or Firm* — Madson IP, P.C.

(57) ABSTRACT

An inertia pump is connected to and actuated by the vibration of a vibratory device to pump lubricant to lubricate internal components of the vibratory device. The inertia pump has a bottom end cap with an inlet in fluid communication with the vibratory device, a top end cap with an outlet for delivering the lubricant to lubricate components of the vibratory device, a tube disposed between and sealingly engaging the bottom end cap and the top end cap, and a piston having a lubricant passageway. The piston is slidably disposed within the tube downstream of the bottom end cap and upstream of the top end cap. Vibration of the vibration device causes the piston to oscillate within the tube to draw lubricant from the vibration device which passes through the lubricant passageway in the piston, and delivers lubricant to lubricate internal components of the vibration device. Upstream of the top end cap a heat exchanger and/or a filter can be used to cool and/or remove debris from the lubricant before lubricating the internal components.

26 Claims, 8 Drawing Sheets

INERTIA PUMP FOR VIBRATORY EQUIPMENT

TECHNICAL FIELD

The present invention relates generally to pumps used to lubricate moving parts in equipment. More specifically, the present invention relates to an inertia pump that facilitates the lubrication of vibratory equipment such as pile drivers and the like.

BACKGROUND

Most vibratory devices, such as material tamping devices, pile drivers, vibrating tables, wick drain devices and fruit-tree shakers and the like, create desirable vibration by rotating eccentrics. In these devices, due to the wear and tear and heat resulting from vibrating machinery, it is desirable to have continuous lubrication of various internal components such as the meshing gears, bearings, and the eccentrics. Such continuous lubrication has been of two types, one by fluttering and the other by nebulization.

Generally, the "nebulized" lubrication involves throwing lubricant sprays onto the bearings and other components susceptible to heat and wear. The excess lubricant (e.g., oil) is collected in a recovery basin and then returned from the basin to spraying nozzles by a motorized pump. This type of lubrication is performed in a free atmosphere. In some embodiments of nebulized lubrication, the bearings are force lubricated by directing the lubricant directly into sealed bearings and returning excess lubricant to a recovery basin that is separated from the interior of the gear box by a wall that keeps the lubricant out of the interior of the gear box.

A drawback to this type of lubrication is that it typically requires a vibration-tolerant motor to drive the pump, which adds significant weight and cost to the system and requires a power source for the motor, reducing the overall efficiency of the vibratory device. Additionally, because the meshing gears, bearings, and eccentrics are enclosed within the gear box, they are hidden from the operator's view. Consequently, if the motorized pump or any part of the pumping system fails, the operator frequently will not know of the failure until after serious damage to the vibratory device has occurred. Vibratory devices have been known to cease up due to lack of lubrication when the lubricant pumping system unknowingly fails.

Lubrication "by fluttering" has been performed both in a free atmosphere and under vacuum. Generally, this type of lubrication involves driving the eccentrics into rotation within a lubricant container or reservoir. The lubricant is thrown by the centrifugal force of the eccentrics. Particularly with eccentrics that have a semi-circular profile, rotation of the eccentric around its axis causes the eccentric to impact against the lubricant within the container or reservoir. This causes lubricant splash within the gear box (or housing) and forces the lubricant against the interior walls of the gear box. At startup of the vibratory device, this impact is generally rather strong, although it depends on the diameter of the eccentric, its thickness, and the level of and viscosity of the lubricant. Such impact, retards the rotating momentum of the eccentric and absorbs energy making the vibratory device less efficient than it could be if this impact were significantly reduced or eliminated. So long as the lubricant is regularly changed and appropriate levels of lubricant are maintained, the lubricant is always present within the gear box. However, during operation of the vibratory device following startup, the lubricant is so violently agitated, both by the vibration and from eccentric impact, that much, if not all, of the lubricant becomes a fine mist of lubricant globules suspended within the interior volume of the gear box.

Because the bearings are most susceptible to overheating and wear, lubrication of the bearings is usually the highest priority with vibratory devices. Although the fine mist of lubricant lubricates the internal components of the vibratory device, the bearings are not as effectively lubricated as force lubricating the bearings. By force lubricating the bearings, it has been said that the eccentric weights can be rotated at higher speeds to create more vibratory amplitude and power. However, heretofore, force lubricating the bearings requires a motorized pump that forces the lubricant into the bearings. The disadvantages of using a motorized pump to force lubricate have been mentioned above.

SUMMARY OF THE INVENTION

The inertia pump of the present disclosure provides a hybrid lubricating system that uses both a lubricant reservoir and a form of force lubrication. However, the inertia pump does not require a power source other than the vibration already created by the vibratory device. No vibration-tolerant, power-driven motor is needed to drive the inertia pump. Further, the inertia pump can be retrofit to most existing vibratory devices that already have a lubricant reservoir within the housing of the vibratory device.

Although, the inertia pump will work with most vibratory devices such as material tamping devices, pile drivers, vibrating tables, wick drain devices and fruit-tree shakers and the like, for clarity of description and brevity, this disclosure will be directed to use of the inertia pump on a vibratory pile driver. Of course, a person of ordinary skill in the art will be able to implement embodiments of the inertia pump of this disclosure with other vibratory devices.

Vibratory assemblies for imparting a vibratory force to a pile typically comprise a suppressor housing to absorb vibration so that it does not travel up the cable to the crane boom, an exciter that creates the vibratory force, and a clamp assembly for connecting the vibratory assembly to the pile to be driven or extracted. Routinely, the exciter has a housing that houses the eccentrics rotatable on shafts to create vibration, a gear drive to rotate the eccentrics, and lubricant to lubricate the bearings, eccentrics, and gears.

Existing vibratory assemblies typically have a lubricating system, either a motorized pump that force lubricates the bearings or a lubricant reservoir in the bottom portion of the housing (also known as the gear box) that is impacted by the eccentrics and agitated by the vibration. The exciter with the lubricant reservoir also has a drive motor that rotates the gear drive that engages the eccentrics in a gear tooth meshing engagement so that the eccentrics rotate at high speed (e.g., up to 2,000 Revolutions Per Minute (RPM)). The eccentrics impact the lubricant reservoir with each revolution causing lubricating splash and then eventually misting of the lubricant within the gear box. Depending on the speed at which the eccentrics are rotated, the surface level of the lubricant reservoir before startup, the viscosity of the lubricant, and the degree of agitation caused by the vibration of the device among other factors, much of the lubricant, if not all of the lubricant, within the interior of the gear box becomes a fine mist of suspended lubricant gobules during operation post startup. Manufacturers of the vibratory devices that force lubricate the bearings claim to be able to rotate the eccentrics at as much as 2,800 RPM.

The exciters best suited for a lubricating system using embodiments of the inertia pump of the present disclosure have a housing with an interior having a reservoir portion for receiving the lubricant, at least a first eccentric weight secured to a first shaft rotatable in a clockwise direction about the longitudinal axis of the first shaft and a second eccentric weight secured to a second shaft rotatable in a counter-clockwise direction about the longitudinal axis of the second shaft, a drive motor for rotating the first eccentric weight and the second eccentric weight to cause vibration of the housing. Larger exciters may have additional pairs of oppositely rotating eccentrics, for example, four or six eccentrics configured in a horizontal line or vertically stacked in pairs. Usually, only the lowermost eccentrics impact the lubricant reservoir. Each configuration of vibratory assemblies, absent the use of an inertia pump system, has its own challenges for proper lubrication of the internal components, particularly the bearings.

For the purpose of this disclosure, the term "eccentric weight" shall mean the entirety of the eccentric which includes the gear portion, whether or not the gear portion contributes to eccentric moment, and the eccentric portion which includes everything that contributes to the eccentric moment and includes the gear portion if the gear portion is eccentric.

With most vibratory pile drivers, at least one lubricant drain portal is provided which is gun drilled into the bottom plate of the housing. The lubricant drain portal subtends the lubricant reservoir providing a passageway for lubricant to drain from the bottom of the reservoir to an exit port. During use of the vibratory device, the exit port is plugged. Removal of the plug, allows the lubricant within the reservoir to completely drain out of the gear box. For vibratory pile drivers that do not have a lubricant drain portal, a lubricant drain portal can be gun drilled into the device to accommodate a retrofit of the inertia pump.

An inertia pump, in various embodiments of the present disclosure, is connected to the housing at the exit port of the lubricant drain portal thereby opening fluid communication with lubricant within the lubricant drain portal and the reservoir portion of the housing. When the lubricant reservoir is filled to an appropriate level, the lubricant drain portal will also be filled with lubricant. The vibration of the housing causes a piston within the inertia pump to oscillate within a tube so that the inertia pump draws lubricant from the lubricant reservoir in the reservoir portion of the housing, through the lubricant drain portal, and delivers lubricant back into the housing to lubricate the internal components such as bearings, shafts, gears, and eccentrics. The inertia pump, through its operation, imparts pressure to the lubricant passing through the inertia pump so that sufficient pressure is provided to direct the lubricant back into the gear box to provide a degree of force lubrication of the bearings and other internal components. Also, the lubricant passing through the inertia pump in additional embodiments of the system can be forced through a heat exchanger to remove heat from the lubricant and/or through a filter to remove undesired particulate debris from the lubricant. With these embodiments, the deterioration of the lubrosity of the lubricant is significantly reduced, unlike lubricants that are exposed to overheating and undesired particulate debris entrained within the lubricant. By continuously removing heat from the vibratory device and/or cleaning the lubricant, the vibratory device operates more efficiently, optimizing power and vibration amplitude. Also, the lubricant requires changing less often, at great cost savings by reducing lubricant replacement costs, service costs, and device down time.

The inertia pump comprises a bottom end cap with an inlet in fluid communication with the lubricant reservoir within the reservoir portion of the housing; a top end cap with an outlet for delivering lubricant to lubricate the internal components of a vibratory device such as the gears, bearings, and eccentrics; a tube disposed between and sealingly engaging the bottom end cap and the top end cap; and a piston having a lubricant passageway where the piston is slidably disposed within the tube downstream of the bottom end cap and upstream of the top end cap. As the vibratory device vibrates, the vibration of the housing moves the piston within the tube in an oscillating fashion alternately creating a vacuum and pushing lubricant so that the inertia pump draws lubricant from the lubricant reservoir within the reservoir portion, pushes lubricant through the lubricant passageway, and delivers lubricant to lubricate the internal components of a vibratory device such as the gears, bearings, and eccentrics.

In some embodiments, the piston has a check valve disposed within the lubricant passageway which allows lubricant to pass downstream but prevents or inhibits backflow upstream through the lubricant passageway. Additionally, the inertia pump may have a suspension structure for suspending the piston between the bottom end cap and top end cap to inhibit the piston from impacting the bottom end cap and top end cap. The suspension structure can take a variety of forms known in the industry to provide resilience while maintaining the piston suspended. The suspension structure can comprise a biasing member disposed between the piston and the bottom end cap and a biasing member disposed between the piston and the top end cap. These biasing members can be a resilient sponge-like rubber, helical springs, leaf springs, or any other suitable structure, or any combination thereof, that provides biasing against the piston but permits the flow-through of lubricant and permits the piston to oscillate within the tube in response to vibration. For example, a resilient sponge-like rubber spacer could be placed between the piston and the bottom end cap and a helical spring could be placed between the piston and the top end cap. Or, for example, helical springs could be placed both upstream and downstream of the piston.

Other embodiments can have a second check valve disposed upstream of the piston. This second check valve may be located within the inlet of the bottom end cap, within an extension from the mounting plate that extends through an opening in the housing of the exciter, or anywhere in the flow of lubricant upstream of the piston. Additionally, downstream of the outlet of the top end cap, a heat exchanger, a filter, and/or one or more sprayers may be provided for removing heat from the lubricant, filtering lubricant, and/or spraying lubricant on internal components of the exciter such as bearings, shafts, gear interfaces, and the eccentric weights.

BRIEF DESCRIPTION OF THE DRAWINGS

Exemplary embodiments of the invention will become more fully apparent from the following description and appended claims, taken in conjunction with the accompanying drawings. Understanding that these drawings depict only exemplary embodiments and are, therefore, not to be considered limiting of the invention's scope, the exemplary embodiments of the invention will be described with additional specificity and detail through use of the accompanying drawings in which:

DETAILED DESCRIPTION

The presently preferred embodiments of the present disclosure will be best understood by reference to the drawings, wherein like parts are designated by like numerals throughout. It will be readily understood that the components of the present inertia pump for vibratory devices, as generally described and illustrated in the figures herein, could be arranged and designed in a wide variety of different configurations and could be implemented on various other types of vibratory devices. Thus, the following more detailed description of embodiments of the present invention, as represented in FIGS. 1-15, is not intended to limit the scope of the invention, but is merely representative of presently preferred embodiments of the invention.

In this application, the phrases "connected to", "coupled to", and "in communication with" refer to any form of interaction between two or more entities, including mechanical, capillary, electrical, magnetic, electromagnetic, pneumatic, hydraulic, fluidic, and thermal interactions.

The phrases "attached to", "secured to", and "mounted to" refer to a form of mechanical coupling that restricts relative translation or rotation between the attached, secured, or mounted objects, respectively. The phrase "slidably attached to" refer to a form of mechanical coupling that permits relative translation, respectively, while restricting other relative motions. The phrase "attached directly to" refers to a form of securement in which the secured items are in direct contact and retained in that state of securement.

The term "abutting" refers to items that are in direct physical contact with each other, although the items may not be attached together. The term "grip" refers to items that are in direct physical contact with one of the items firmly holding the other. The term "integrally formed" refers to a body that is manufactured as a single piece, without requiring the assembly of constituent elements. Multiple elements may be integrally formed with each other, when attached directly to each other from a single work piece. Thus, elements that are "coupled to" each other may be formed together as a single piece.

Figure 1:
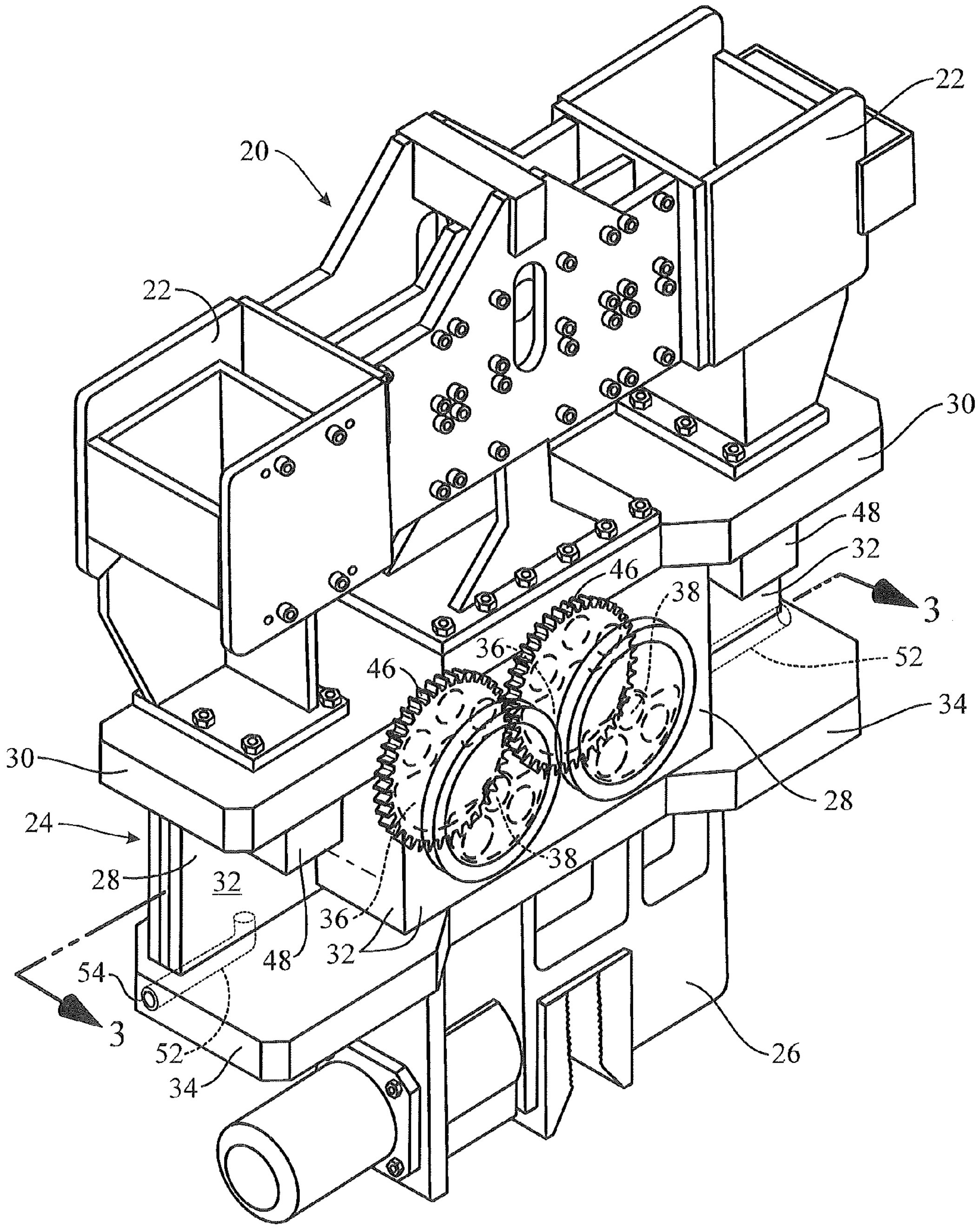
FIG. 1 PRIOR ART
FIG. 1 is perspective view of a known exemplary vibratory assembly showing a suppressor housing, an exciter, a clamp attachment, and a lubricant drain portal (shown in phantom lines)
Figure 2:
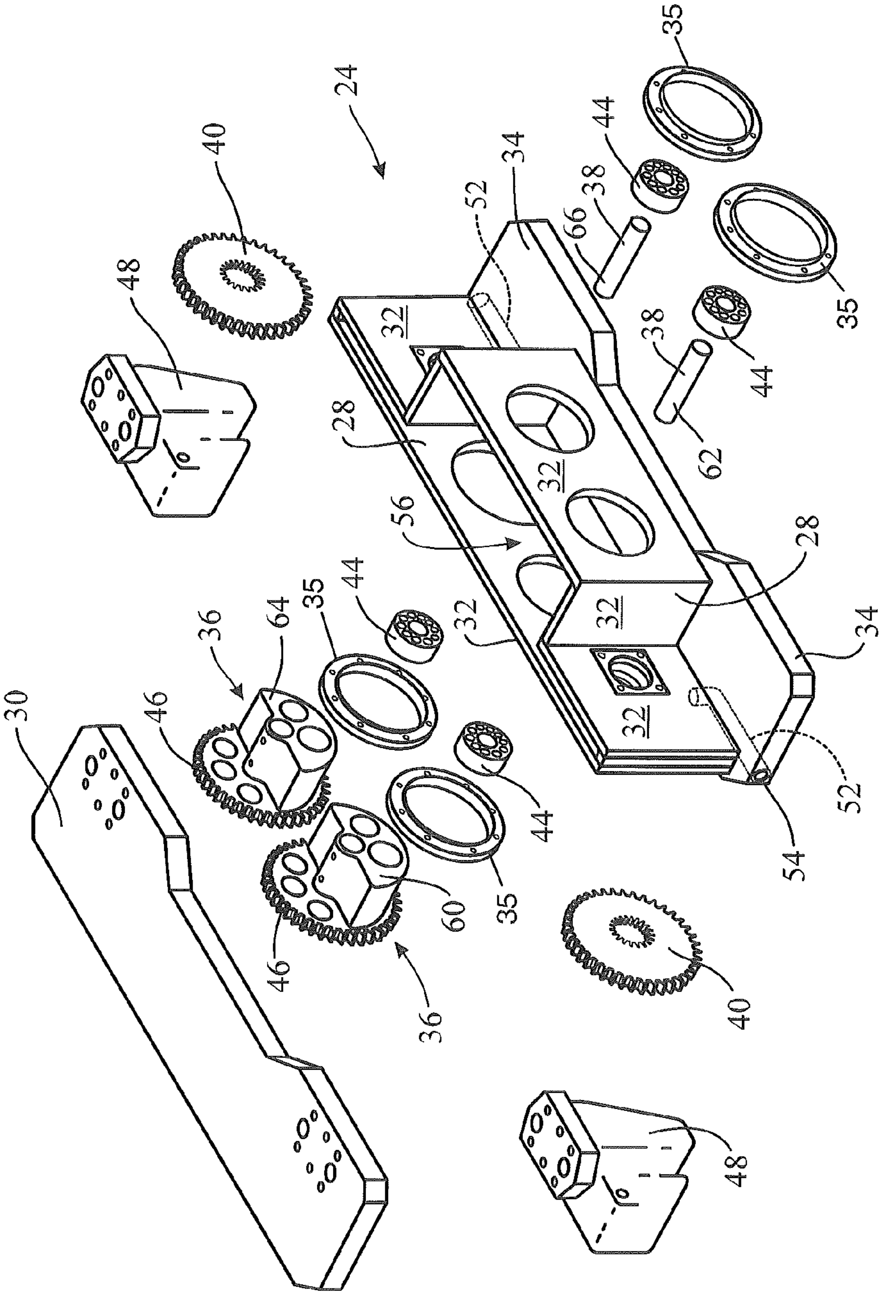
FIG. 2 PRIOR ART
FIG. 2 is an exploded perspective view of the exciter of a known exemplary vibratory assembly with some components omitted for clarity.

FIGS. 1 and 2 are perspective views of known exemplary vibratory assemblies, provided to demonstrate a representative environment in which the various embodiments of the inertia pump of the present disclosure may operate. Of course, the inertia pump will work with most vibratory devices such as material tamping devices, pile drivers, vibrating tables, vibratory wick drain devices and fruit-tree shakers and the like. For clarity of description and brevity, this disclosure will be directed to use of the inertia pump on an exemplary vibratory pile driver (shown in FIGS. 1 and 2). A person of ordinary skill in the art will be able to implement embodiments of the inertia pump of this disclosure with other vibratory devices.

FIG. 1 is a perspective view of an exemplary vibratory assembly 20 showing a suppressor housing 22, an exciter 24, and a clamp attachment 26. Vibratory assemblies 20 for imparting a vibratory force to a pile typically comprise a suppressor housing 22 to absorb vibration so that it does not travel up the cable to the crane boom, an exciter 24 that creates the vibratory force, and a clamp attachment 26 for connecting the vibratory assembly 20 to the pile to be driven or extracted. The operation and components of vibratory assemblies 20 are well known in the industry and, for brevity, will not be described in detail in this disclosure, except to the extent that the inertia pump of this disclosure affects the operation or involves components of the vibratory assembly 20. Routinely, the exciter 24 has a housing 28 (also known as and sometimes referred to herein as a "gear box") with a top plate 30, side walls 32, a bottom plate 34 and bearing covers 35 that houses the eccentrics 36 rotatable on shafts 38 to create vibration, a gear drive 40 to rotate the eccentrics 36, and lubricant 42 to lubricate internal components of the vibratory assembly 20, such as the bearings 44, eccentrics 36, and gears 46. The exciter 24 also has a drive motor 48 that rotates the gear drive 40 that engages the eccentrics 36 in a gear tooth meshing engagement so that the eccentrics 36 rotate at high speed. The vibratory assembly 20 typically has a lubricant reservoir 50 (see FIG. 3) in the bottom portion of the housing 28. At startup, the eccentrics 36 impact the lubricant reservoir 50 with each revolution causing lubricating splash within the interior of the housing 28.

For maintenance purposes, most exciters 24 have some means for draining the lubricant from the housing 28 so that the lubricant 42 can be changed. This draining means can be as simple as a drain hole in the side of the housing 28 or as sophisticated as a gun drilled lubricant drain portal 52 extending within the bottom plate 34 of the housing 28 to a position along the bottom of lubricant reservoir 50. As shown in phantom lines in FIGS. 1-3, exemplary lubricant drain portals 52 are illustrated. During use of the vibratory assembly 20, the lubricant drain portals 52 are closed by plugs 54 secured at the exterior of the housing 28. To drain used lubricant 42 from the vibratory assembly 20 so that the lubricant 42 can be changed out for fresh, clean lubricant 42, the plug(s) 54 is/are removed. Once drained, the plug(s) 54 can be re-secured and the lubricant reservoir 50 can be refilled with fresh, clean lubricant 42. Filling the lubricant reservoir 50 also fills the lubricant drain portal 52 with lubricant 42.

A typical exciter 24 has a housing 28 with an interior 56 having a reservoir portion 58 for receiving the lubricant 42, at least a first eccentric weight 60 secured to a first shaft 62 rotatable in a predetermined direction (either clockwise or counter-clockwise) about the longitudinal axis of the first shaft 62 and a second eccentric weight 64 secured to a second shaft 66 rotatable in an opposite direction (either counter-clockwise or clockwise) about the longitudinal axis of the second shaft 66, a drive motor 48 for rotating the first eccentric weight 60 and the second eccentric weight 64 to cause vibration of the housing 28. Larger exciters 24 may have additional pairs of oppositely rotating eccentrics 36, for example, four or six eccentrics 36 configured in a horizontal line or vertically stacked in pairs are common. Usually, only the lowermost eccentrics 36 impact the lubricant reservoir (see FIG. 3 for context, with most existing vibratory devices, the eccentrics 36 extend well into the lubricant reservoir 50).

Figure 3:
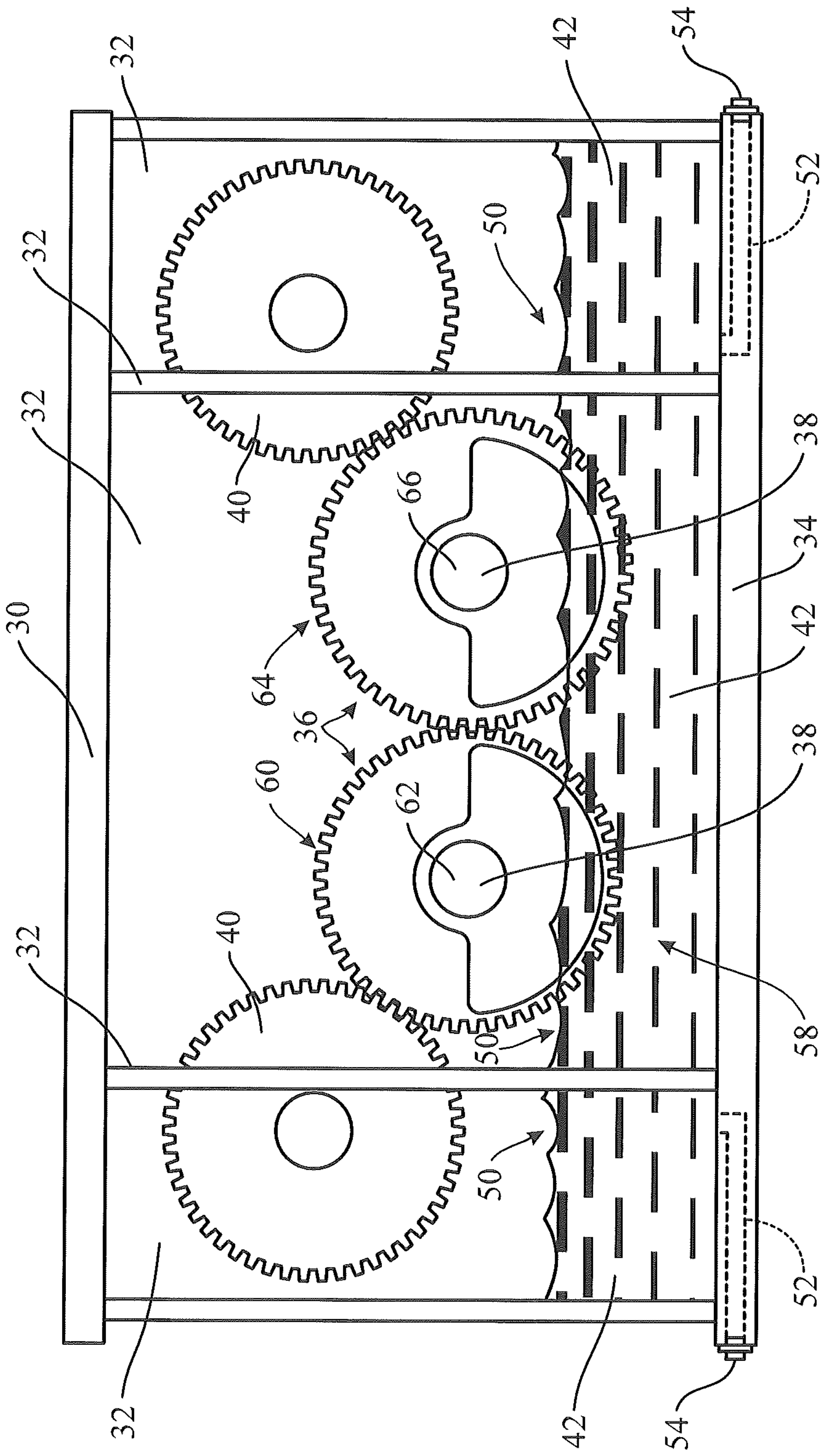
FIG. 3 PRIOR ART
FIG. 3 is a contorted transverse sectional view along line 3-3 of FIG. 1.
Figure 3A:
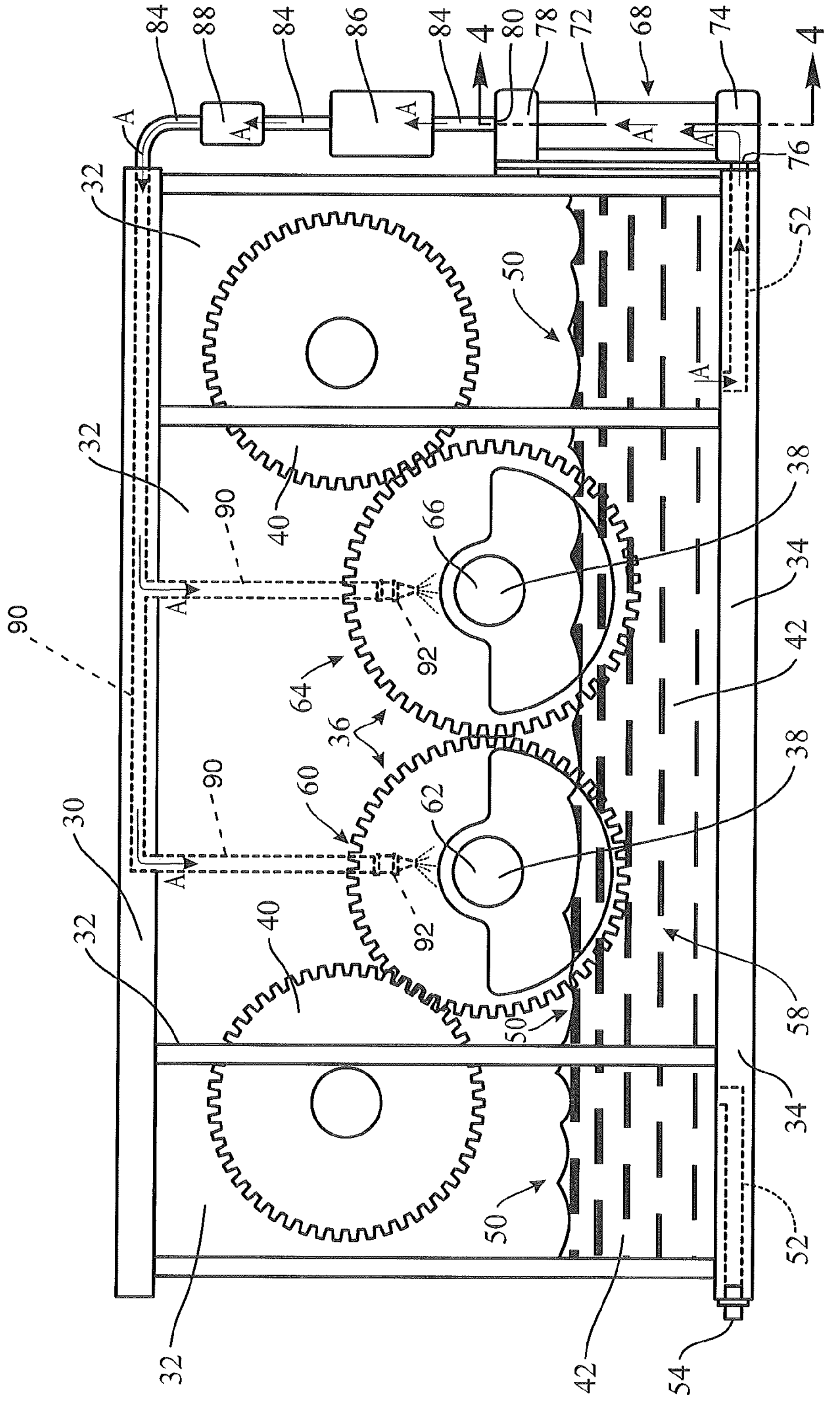
FIG. 3A is a contorted transverse sectional view similar to that of FIG. 3 of an exciter showing an exemplary mounting of an inertia pump, again some components are omitted for visual clarity.
Figure 4:
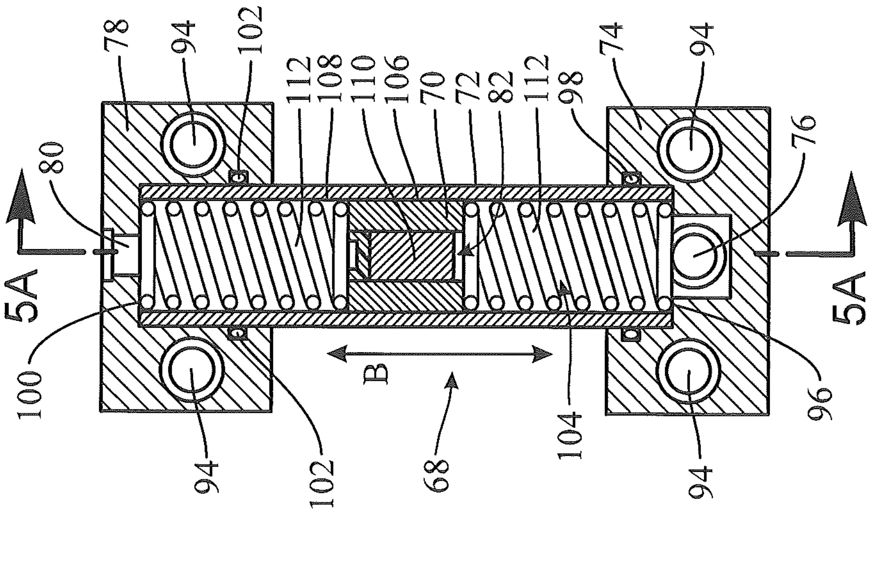
FIG. 4 is a sectional view of the inertia pump along line 4-4 of FIG. 3A.

An inertia pump 68 of the present disclosure is shown in FIGS. 3A and 4. The inertia pump 68 is connected to the housing 28 and is in fluid communication with lubricant 42 in the reservoir portion 58 of the housing 28. The inertia pump 68 can be connected to the housing at a drain hole or, as shown in FIG. 3A, at the lubricant drain portal 52. Accordingly, the inertia pump 68 can be retro fit easily to an existing exciter 24. When the exciter 24 is actuated, it creates vibration in a generally vertical up and down direction and it is this vibration of the housing 28 that causes a piston 70 (see FIG. 4) within the inertia pump 68 to oscillate slidably within a tube 72 (acting as a cylinder for the piston 70) so that the inertia pump 68 draws lubricant 42 from the lubricant reservoir 50 in the reservoir portion 58 of the housing 28, through the lubricant drain portal 52 and delivers lubricant 42 back into the housing 28 to lubricate the internal components such as bearings 44, shafts 38, gears 46, and eccentrics 36.

With known exciters 24 that have eccentrics 36 dipping deeply into the lubricant reservoir 50, significant amounts of vibratory energy may be lost due to the repeated impact of the eccentrics 36 with the lubricant reservoir 50. To optimize the benefits of lubricating the internal components of the exciter 24 while minimizing lost vibratory energy, it may be advantageous to have the eccentrics 36 dip slightly into the lubricant reservoir 50 so that impact is minimized causing some splash of lubricant 42. The optimal level of the lubricant reservoir 50 can be determined by testing the drive force achieved at various levels. A person of skill in the art knows how to measure drive force, and will be able to determine optimal level of the lubricant reservoir 50 for a particular exciter 24.

With known exciters 24 that operate at higher speeds, for example up to about 2,000 RPM, the power loss due to the eccentrics 36 impacting the lubricant 42 occurs only at startup of the exciter 24, unless the lubricant reservoir 50 is significantly over-filled. Once the higher operating speeds are achieved, the lubricant 42 is so agitated due to the splash from the impacting eccentrics 36 and the vibration of the exciter 24 that much, if not all, of the lubricant 42 within the lubricant reservoir 50 becomes a fine mist of suspended lubricant gobules that fills the interior 56 of the housing 28, lubricating all of the internal components.

The systems for lubricating using an inertia pump 68 that are described and suggested herein are hybrid systems that utilize a lubricant reservoir 50 and a form of force lubrication driven by the inertia pump 68. Hence, due to the hybrid nature of the system, the danger that the exciter 24 will be damaged due to a lack of lubrication is virtually eliminated. If the inertia pump 68 fails, there is still a lubricant reservoir 50 to provide lubrication. Additionally, the advantages of force lubrication are also available, at least to a degree, with the hybrid system using an inertia pump 68.

Further, although not shown specifically, more than one inertia pump 68 may be used with an exciter 24 to provide more lubricant 42 flow for lubrication. It may even be advantageous to have inertia pumps 68 on opposite sides of the housing 28 so that the weight balances to optimize drive force.

The inertia pump 68 comprises a bottom end cap 74 with an inlet 76 in fluid communication with the lubricant reservoir 50 within the reservoir portion 58 of the housing 28, a top end cap 78 with an outlet 80 for delivering lubricant 42 to lubricate the internal components of a vibratory assembly 20, a tube 72 disposed between and sealingly engaging the bottom end cap 74 and the top end cap 78, and a piston 70 having a lubricant passageway 82. The piston 70 is slidably disposed within the tube 72 downstream of the bottom end cap 74 and upstream of the top end cap 78. As the vibratory assembly 20 vibrates, the vibration of the housing 28 moves the piston 70 relative to the tube 72 in an oscillating fashion alternately creating a vacuum and pushing lubricant 42 so that the inertia pump 68 draws lubricant 42 from the lubricant reservoir 50 within the reservoir portion 58, pushes lubricant 42 through the lubricant passageway 72, and delivers lubricant 42 to lubricate the internal components of the vibratory assembly 20. The internal components include but are not limited to bearings 44, gears 46, shafts 38, and eccentrics 36.

As shown by way of example in FIG. 3A, a pair of lubricant drain portals 52 are gun drilled into the bottom plate 34 of the housing 28 and are subtending the lubricant reservoir 50. For explanatory purposes, FIG. 3A shows one lubricant drain portal 52 closed by a plug 54 and another lubricant drain portal 52 connected to an inertia pump 68. Of course, inertia pumps could be connected to each lubricant drain portal 52. It is through the lubricant drain portal 52 that lubricant 42 is drawn from the lubricant reservoir 50. When the lubricant reservoir 50 is filled to the desired level, the lubricant drain portals 52 are also filled with lubricant 42. Because the lubricant drain portals define a confined space within the bottom plate 34, the lubricant 42 within the lubricant drain portals 52 does not become a fine mist of lubricant gobules during vibration of the exciter 24. Rather, the lubricant 42 drawn into the lubricant drain portal 52 collects and settles therein as it is drawn into the inertia pump 68.

Vibration caused movement of the piston 70 alternately creates a vacuum that draws and collects lubricant 42 into the lubricant drain portal 52 and through inlet 76 into the tube 72 and forces lubricant 42 through the lubricant passageway 82 and out of outlet 80. In one embodiment, as shown in FIG. 3A, lubricant 42 passing through the outlet 80 flows within an outlet conduit 84 and is directed towards internal components within the housing 28 for which lubrication is advisable.

In some embodiments, a heat exchanger 86 and/or a filter 88 (each shown schematically in FIG. 3A) is/are provided in-line upstream of the top end cap 78. The heat exchanger 86 removes heat from the lubricant 42 passing therethrough in a manner known to those skilled in the art. The removal of heat can significantly increase the overall efficiency of the exciter 24 by reducing the risk of overheating internal components such as bearings 44 and overheating the lubricant 42. The lubricant 42 can lose lubrosity by overheating.

The filter 88 removes unwanted debris entrained within the lubricant 42 resulting from the natural wear and tear caused by the interaction and intermeshing of the internal components and the violent vibration of the exciter 24. The removal of debris during use can also significantly increase the efficiency of the exciter 24 by reducing the risk of cataclysmic failure, reducing the frequency at which the lubricant 42 must be changed, reducing lubricant and servicing costs, and removing down time of the exciter 24 to have the lubricant 42 changed.

Although any suitable form of lubricant 42 delivery (e.g., sprayer, drip line, flooding, etc.) to the areas where lubrication is desired, in some embodiments, a form of force lubrication for the bearings 44 can be used. Since the inertia pump 68 moves lubricant under force, delivery conduits 90 can be provided that direct the lubricant 42 directly to an internal component to force lubricate the internal component. Force lubricating bearings 44 can be more effective that fluttering lubrication of the bearings 38. As shown in phantom lines in FIG. 3A, delivery conduits 90 can be gun drilled into the housing 28 top plate 30 and/or side walls 32 to deliver lubricant 42 directly to a bearing 44 and an appropriate fitting (not shown, but known in the art) can force lubricate the bearing 44. Persons of skill in the art can determine what form of delivery may be the most effective for any particular vibratory device. Of course, in lieu of or in addition to force lubricating, sprayers 92 (as shown in phantom lines in FIG. 3A) can be provided to spray lubricant 42 onto any of the internal components.

In FIG. 3A, arrows A show the directional flow of the lubricant 42 from the lubricant reservoir 50 through the inertia pump 68 and back into the interior 56 of the housing 28. Dual-arrow B, as shown in FIG. 4, shows the directions that the piston 70 oscillates relative to tube 72.

The inertia pump 68 is shown in cross section in FIG. 4. The inertia pump 68 shown has a bottom end cap 74 with an inlet 76, mounting bores 94, and a bottom recess 96 into which the tube 72 seats and is sealed in place by a bottom o-ring 98 (see also FIGS. 6 and 7). The inertia pump 68 shown also has a top end cap 78 with an outlet 80, mounting bores 94, and a ceiling recess 100 into which the tube 72 seats and is sealed in place by a top o-ring 102 (see also FIGS. 8 and 9). In this manner, the tube 72 is sealingly secured between the bottom end cap 74 and the top end cap 78 and defines a glide channel 104 (or cylinder) within which the piston 70 oscillates. In the embodiment shown, the piston 70 has an exterior surface 106 that registers with and is only slightly smaller that the interior surface 108 of the tube 72 so that the piston 70 will freely slide as shown by dual-arrow B without allowing substantial lubricant 42 to pass between the exterior surface 92 of the piston 70 and the interior surface 94 of the tube 72. Of course, it should be understood that the configuration of the piston 70 could differ from what is shown. For example, in addition to or in lieu of the lubricant passageway 82, the piston 70 could have grooves or channels along the exterior surface 106 of the piston 70 or bores through the piston 70 that act as lubricant passageways to allow lubricant 42 to flow from the upstream end of the piston 70 to the down stream end of the piston 70. It should be understood that the term "lubricant passageway" is not limited to a cylindrical opening along the central axis of the piston 70, but includes any type of passageway (grooves, channels, bores, conduits, and the like) that allows lubricant 42 to flow from the upstream side of the piston 70 to the down stream side of the piston 70. Those skilled in the art will understand how the piston 70 can be configured to optimize the flow of lubricant 42 for a particular use of the inertia pump 68.

Figure 5A:
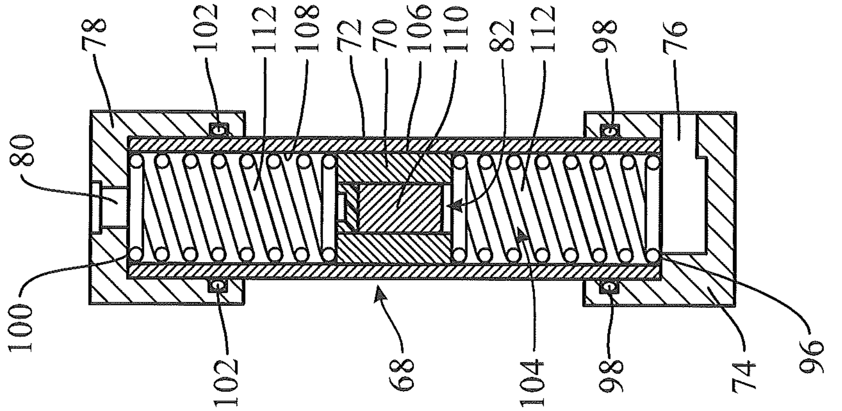
FIG. 5A is a sectional view of an embodiment of the inertia pump along line 5A-5A of FIG. 4.
Figure 5B:
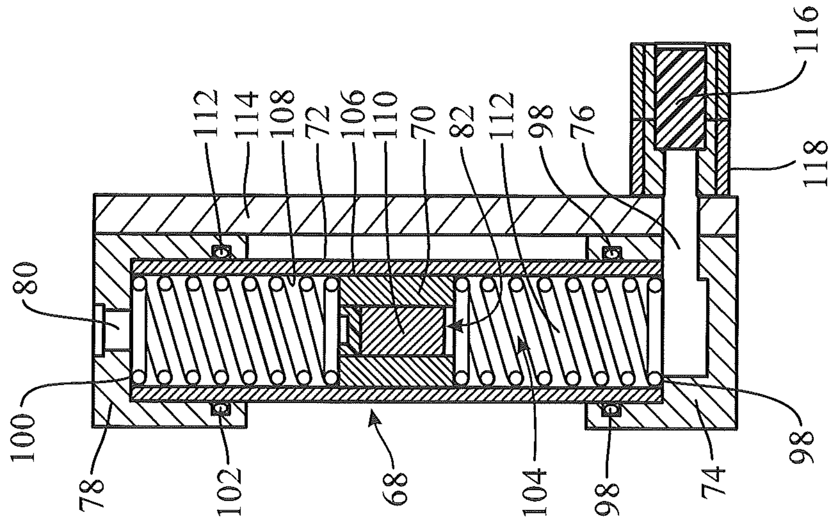
FIG. 5B is a sectional of an alternative embodiment of the inertia pump along 5A-5A of FIG. 4.
Figure 6:
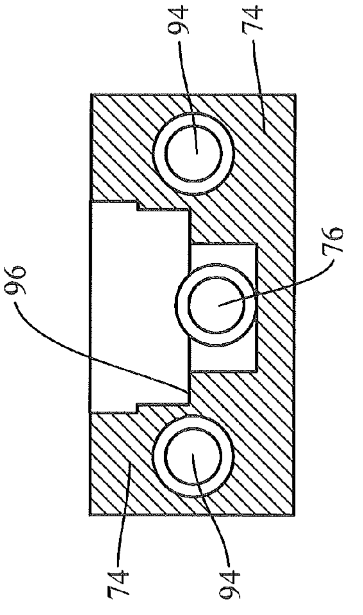
FIG. 6 is a front elevation sectional view of the bottom end cap of an inertia pump showing the inlet, mounting bores, and the base seating area.
Figure 7:
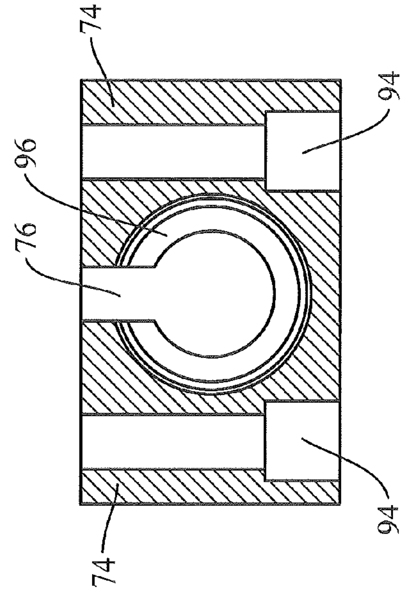
FIG. 7 is a top plan sectional view of the bottom end cap of an inertia pump showing the base seating area, the flow channel, the inlet, and the mounting bores.
Figure 8:
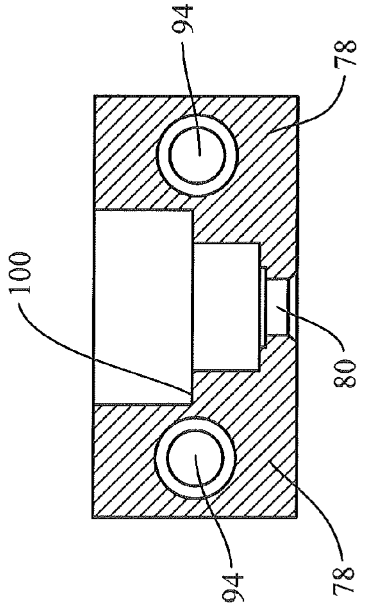
FIG. 8 is a front elevation sectional view of the top end cap of an inertia pump showing the outlet, mounting bores, and the ceiling seating area.
Figure 9:
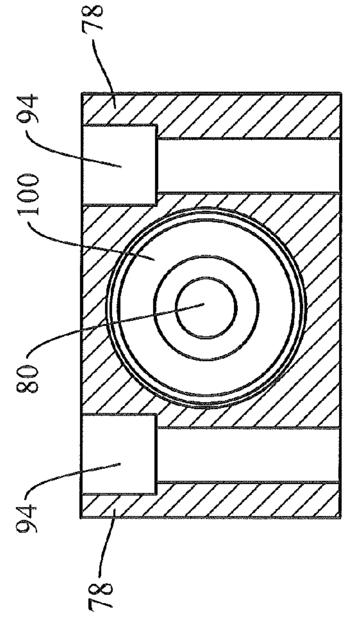
FIG. 9 is a top plan view of the top end cap of an inertia pump showing the ceiling seating area, the outlet, and the mounting bores.
Figure 12:
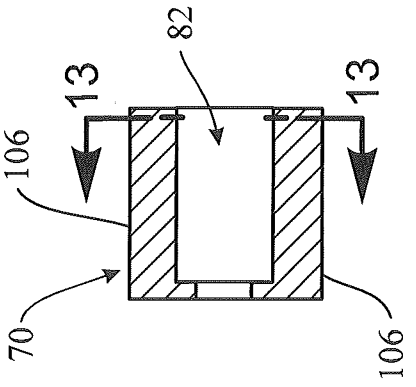
FIG. 12 is a sectional view of an embodiment of the piston showing the lubricant passageway.
Figure 13:
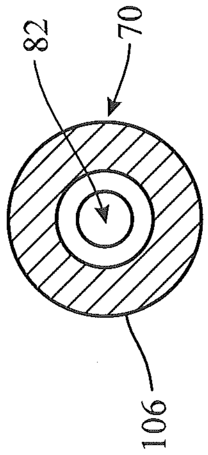
FIG. 13 is a sectional view of the piston along line 13-13 of FIG. 12.
Figure 10:
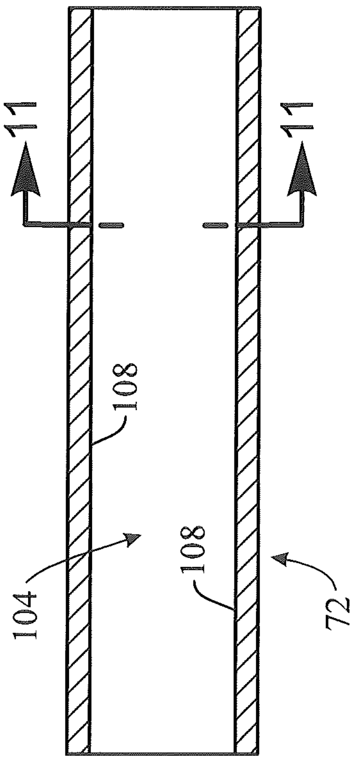
FIG. 10 is a longitudinal section view of the tube for housing the piston and to be disposed between the bottom end cap and top end cap, nesting in the base seating area and ceiling seating area, respectively.
Figure 11:
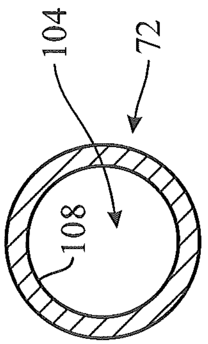
FIG. 11 is a sectional view of the tube along line 11-11 of FIG. 10.
Figure 15:
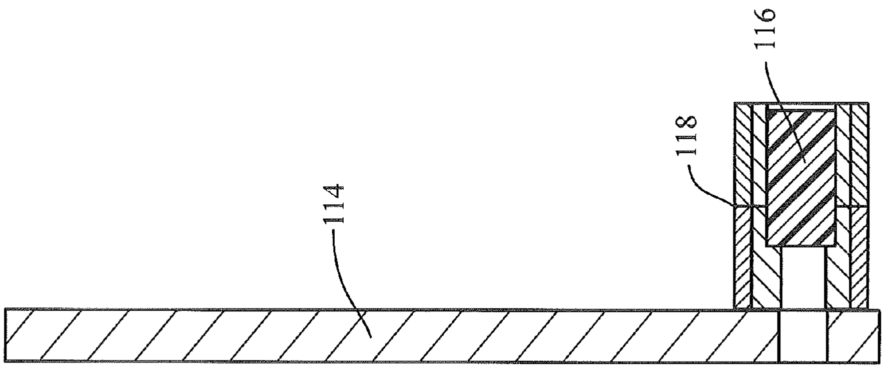
FIG. 15 is a sectional view of the mounting plate and connection conduit along line 15-15 of FIG. 14.

In the embodiments shown in FIGS. 4 and 5A-5B, the piston 70 has a cylindrical lubricant passageway 82 extending along the longitudinal axis. Within the lubricant passageway 82 is a passageway check valve 110 that permits lubricant 42 to flow in the direction shown by arrows A (FIG. 3A), but inhibits flow in the opposite direction. Although the passageway check valve 110 is optional, it does insure an advancing flow of the lubricant 42.

The piston 70 is also suspended by structure that holds the piston 70 so that it does not impact either the bottom end cap 74 or the top end cap 78. The suspension structure can take a variety of forms known in the industry to provide resilience while maintaining the piston 70 suspended. The suspension structure can comprise a biasing member disposed between the piston 70 and the bottom end cap 74 and a biasing member disposed between the piston 70 and the top end cap 78. These biasing members can be a resilient sponge-like rubber, helical springs, leaf springs, or any other suitable structure, or any combination thereof, that provides biasing against the piston 70 but permits the flow through of lubricant 42 and permits the piston 70 to oscillate relative to the tube 72 in response to vibration. For example, a resilient sponge-like rubber spacer could be placed between the piston 70 and the bottom end cap 74 and a helical spring 112 could be placed between the piston 70 and the top end cap 78. Or, for example, helical springs 112 could be placed both upstream and downstream of the piston 70, as is shown in FIGS. 4 and 5A-5B. Optimally, the piston 70 would suspend unmoving relative to the ground, but would oscillate relative to the tube 72 which vibrates vertically up and down with the exciter 24 to which it is connected.

The embodiment shown in FIG. 5A, shows an inertia pump 68 that can be mounted directly to the housing 28 using mounting bolts (not shown) secured within the mounting bores 94 so that the inlet 76 can be connected to the lubricant drain portal 52 (see also FIG. 3A).

An alternative embodiment is shown in FIG. 5B. This embodiment shows an inertia pump 68 secured to a mounting plate 114 (see also FIGS. 14 and 15) with a inlet check valve 116 disposed upstream of the piston 70 that can insert into the lubricant drain portal 52. The mounting plate 114 can be secured to the housing 28 by any suitable means, such as by adhesive, welding, bolting, or the like. The inlet check valve 116, in the embodiment shown, is located within an extension 118 coupled to the rear of the mounting plate 114. The extension 118 may extend into the lubricant drain portal 52 within the housing 28. With this embodiment, once lubricant 42 enters the inertia pump 68, the inlet check valve 116 inhibits the lubricant 42 from back flow into the lubricant drain portal 52 and the lubricant reservoir 50. Although the inlet check valve 102 is shown disposed within the extension 118, it can be located anywhere upstream of the piston 70 so long as it inhibits undesirable back flow.

Figure 14:
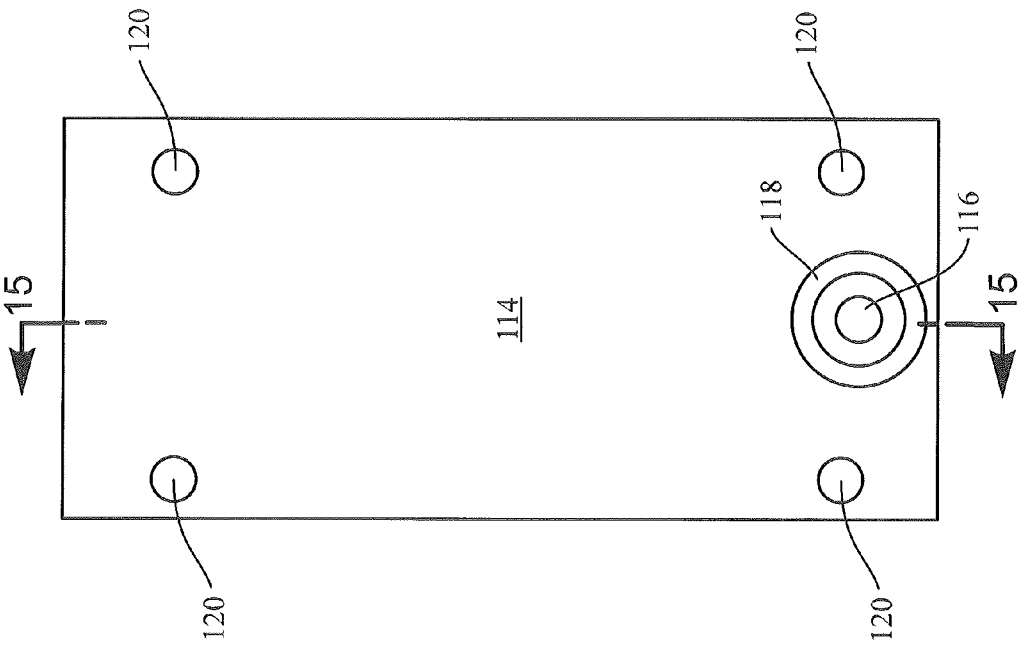
FIG. 14 is an elevation view of the mounting plate showing the connection conduit.

Although the mounting plate 114 can be secured to the housing 28 by any suitable means, such as by adhesive, welding, bolting, or the like, FIG. 14 shows a mounting plate with passthrough bores 120 that align with the mounting bores 94 of the bottom end cap 74 and top end cap 78. With this embodiment for the mounting plate 114, bolts (not shown) can extend through both the mounting bores 94 and the passthrough bores 120 to secure the inertia pump 68 and mounting plate 114 to the housing 28 via receiving bores (not shown) in the housing 28.

Of course, the inertia pump 68 could be attached to new vibratory devices as they are manufactured. However, with minor alterations to existing vibratory devices, a person of skill in the art, armed with this disclosure, could retrofit an existing vibratory device with one or more inertia pumps 68.

While specific embodiments and applications of the present invention have been illustrated and described, it is to be understood that the invention is not limited to the precise configuration and components disclosed herein. Various modifications, changes, and variations which will be apparent to those skilled in the art may be made in the arrangement, operation, and details of the methods and systems of the present invention disclosed herein without departing from the spirit and scope of the invention.

What is claimed is:

1. A vibratory assembly for imparting a vibratory force to a pile, the vibratory assembly for containing lubricant and comprising:

an exciter having a housing with an interior having a reservoir portion for receiving the lubricant in a lubricant reservoir and internal components, the internal components comprising bearings and at least a first eccentric weight rotatable in a clockwise direction and a second eccentric weight rotatable in a counter-clockwise direction, rotation of the first eccentric weight and the second eccentric weight causing vibration of the housing; and an inertia pump connected to the housing and in fluid communication with the lubricant reservoir, the vibration of the housing causing the inertia pump to draw lubricant from the lubricant reservoir and deliver lubricant to lubricate at least one of the internal components.

2. A vibratory assembly as set forth in claim 1, wherein the inertia pump comprises:

a bottom end cap with an inlet in fluid communication with the lubricant reservoir;

a top end cap with an outlet for delivering lubricant to at least one of the internal components;

a tube disposed between and sealingly engaging the bottom end cap and the top end cap; and a piston having a lubricant passageway, the piston slidably disposed within the tube downstream of the bottom end cap and upstream of the top end cap, the vibration of the housing moves the piston relative to the tube to draw lubricant from the lubricant reservoir, to pass lubricant through the lubricant passageway, and to deliver lubricant to lubricate at least one of the internal components.

3. A vibratory assembly as set forth in claim 2, wherein the piston further comprises a first check valve disposed within the lubricant passageway.

4. A vibratory assembly as set forth in claim 2, wherein the inertia pump further comprises a suspension structure for suspending the piston between the bottom end cap and top end cap.

5. A vibratory assembly as set forth in claim 4, wherein the suspension structure comprises a first biasing member disposed between the piston and the bottom end cap and a second biasing member disposed between the piston and the top end cap.

6. A vibratory assembly as set forth in claim 5, wherein at least one of the first biasing member and the second biasing member is a spring.

7. A vibratory assembly as set forth in claim 3, further comprising a second check valve disposed upstream of the piston.

8. A vibratory assembly as set forth in claim 2, wherein downstream of the outlet of the top end cap is at least one delivery conduit directed to at least one bearing for force lubricating the at least one bearing.

9. A vibratory assembly as set forth in claim 2, wherein downstream of the outlet of the top end cap is a heat exchanger for removing heat from the lubricant.

10. A vibratory assembly as set forth in claim 2, wherein downstream of the outlet of the top end cap is a filter for removing debris from the lubricant.

11. An inertia pump for connection to and actuated by the vibration of a vibratory device to pump lubricant, the inertia pump comprises:

a bottom end cap with an inlet for fluid communication with a lubricant reservoir housed within the vibratory device;

a top end cap with an outlet for delivering the lubricant to lubricate at least a portion of the vibratory device;

a tube disposed between and sealingly engaging the bottom end cap and the top end cap; and a piston having a lubricant passageway, the piston slidably disposed within the tube downstream of the bottom end cap and upstream of the top end cap, the vibration of the vibration device moves the piston relative to the tube to draw lubricant from the lubricant reservoir, to pass lubricant through the lubricant passageway, and to deliver lubricant to lubricate at least a portion of the vibration device.

12. An inertia pump as set forth in claim 11, wherein the piston further comprises a first check valve disposed within the lubricant passageway.

13. An inertia pump as set forth in claim 11, wherein the inertia pump further comprises a suspension structure for suspending the piston between the bottom end cap and tope end cap.

14. An inertia pump as set forth in claim 13, wherein the suspension structure comprises a first biasing member disposed between the piston and the bottom end cap and a second biasing member disposed between the piston and the top end cap.

15. An inertia pump as set forth in claim 14, wherein at least one of the first biasing member and the second biasing member is a spring.

16. An inertia pump as set forth in claim 12, further comprising a second check valve disposed upstream of the piston.

17. An inertia pump as set forth in claim 11, wherein downstream of the outlet of the top end cap is at least one delivery conduit directed to at least one bearing for force lubricating the at least one bearing.

18. An inertia pump as set forth in claim 11, wherein downstream of the outlet of the top end cap is a heat exchanger for removing heat from the lubricant.

19. An inertia pump as set forth in claim 11, wherein downstream of the outlet of the top end cap is a filter for removing debris from the lubricant.

20. A method for lubricating portions of a vibratory assembly with a lubricant during the operation of the vibratory assembly, comprising the steps of:

providing an exciter having a housing with an interior having a reservoir portion for receiving the lubricant in a lubricant reservoir, the exciter having internal components comprising bearings and at least a first eccentric weight rotatable in a clockwise direction and a second eccentric weight rotatable in a counter-clockwise direction;

providing an inertia pump connected to the housing and in fluid communication with the lubricant reservoir;

rotating the first eccentric weight and the second eccentric weight to cause vibration of the housing;

drawing lubricant from the lubricant reservoir into the inertia pump; and delivering lubricant to lubricate at least one of the internal components.

21. A method for lubricating portions of a vibratory assembly as set forth in claim 20, wherein the inertia pump comprises:

a bottom end cap with an inlet in fluid communication with the lubricant reservoir;

a top end cap with an outlet for delivering the lubricant to lubricate at least one of the internal components;

a tube disposed between and sealingly engaging the bottom end cap and the top end cap; and a piston having a lubricant passageway, the piston slidably disposed relative to the tube downstream of the bottom end cap and upstream of the top end cap, and the method further comprises the steps of:

moving the piston relative to the tube in response to the vibration of the housing;

drawing lubricant from the lubricant reservoir through the inlet of the bottom end cap and into the tube, passing lubricant through the lubricant passageway;

delivering lubricant to the top end cap for ejection through the outlet of the top end cap to lubricate at least one of the internal components.

22. A method for lubricating portions of a vibratory assembly as set forth in claim 21, wherein the piston further comprises a first check valve disposed within the lubricant passageway and the method further comprises the step of inhibiting backflow of lubricant through the lubricant passageway.

23. A method for lubricating portions of a vibratory assembly as set forth in claim 22, wherein the inertia pump further comprises a second check valve disposed upstream of the piston and the method further comprises the step of inhibiting backflow of lubricant into the lubricant reservoir.

24. A method for lubricating portions of a vibratory assembly as set forth in claim 21, wherein downstream of the outlet of the top end cap is a heat exchanger and the method further comprises the step of removing heat from the lubricant.

25. A method for lubricating portions of a vibratory assembly as set forth in claim 21, wherein downstream of the outlet of the top end cap is a filter and the method further comprises the step of removing debris from the lubricant.

26. A method for lubricating portions of a vibratory assembly as set forth in claim 21, wherein downstream of the outlet of the top end cap is at least one delivery conduit directed to at least one of the bearings and the method further comprises the step of force lubricating at least one of the bearings.

* * * * *